Patented Dec. 7, 1948

2,455,363

UNITED STATES PATENT OFFICE 2,455,363

PROCESS OF MAKING SHORTENING

Arne Gudheim, Winchester, Mass., assignor to Lever Brothers Company, Cambridge, Mass., a corporation of Maine No Drawing. Application May 4, 1944, Serial No. 534,152

2 Claims. (Cl. 99—122)

The present invention relates to substantially dry plastic edible fat products, such as shortenings and lard of improved form and composition. More particularly, the invention relates to substantially dry plastic edible fat products having the physical properties or characteristics deemed essential for general culinary purposes, and yet at the same time may be packaged and stored in an improved manner. The invention also includes the method of preparing, or preparing and packaging, the dry plastic edible fat product.

In the conventional methods used heretofore for preparing a dry plastic edible fat product for marketing, the operations including the preliminary refining and bleaching of the oil or fat, the hydrogenation of the oil, if this step is included, the blending, deodorization and possible other operations, are carried out when the oil is in a liquid state and usually at an elevated temperature.

After the foregoing processing steps are completed, it is customary to cool or chill the oil to form a plastic or semi-solid mass which may be packaged. The mass may be aerated during chilling or subsequently. One of the methods employed heretofore is to run the shortening over chill rolls from which it may be removed in a solidified form suitable for working and aeration in suitable apparatus such as, for example, so-called "picker" boxes. This process is shown, for example, in the patent to Godfrey and Serbell No. 2,101,496. Another conventional method used heretofore is to employ a cooling unit, for example, of the so-called "Votator" type, for simultaneously solidifying and aerating the shortening. A process of this type is shown, for example, in the patent to Godfrey and Serbell No. 2,174,364. The latter may be regarded as representative of the latest prior development of the art and the procedure preferred heretofore.

In solidifying a shortening by any of the conventional methods utilized heretofore, the phenomenum of super-cooling generally takes place. Upon chilling the oil, the sensible heat and some of the latent heat of crystallization is absorbed. Upon release of the chilled oil from the cooling device, further crystallization of the super-cooled oil takes place accompanied by the release of additional latent heat of crystallization, with the result that the heat is absorbed within the mass of the shortening and a temperature rise ensues. For example, a shortening may be cooled to about 0 to 12° C. on a chill roll, but after the fat is removed from the roll, additional crystallization takes place accompanied by the release of the latent heat of crystallization which is absorbed by the fat. As a result, the temperature of the fat rises to about 19 to 22° C. In the "Votator" method the chilled fat has a temperature of about 13 to 18° C. when it issues from the chilling device. Due to the latent heat of crystallization this temperature rises to about 25 to 30° C. (See Patent No. 2,174,364 referred to above.)

Such a temperature rise has been deemed desirable, heretofore, for the purpose of quickly causing the shortening to reach a temperature at which it may be poured into containers and "tempered." In the absence of heat provided by the latent heat of crystallization, the shortening, because of its low heat conductivity, high heat capacity, and the thermal insulation afforded the majority of the packages by surrounding ones, would rise in temperature only very slowly. It is not feasible to apply substantial heat to a shortening in order to raise the temperature thereof, because this results only in a melting of the exterior of the mass which gives it a vaseline-like appearance.

The conventional method of packaging shortening and other dry plastic edible fat products produced by the heretofore described conventional methods has been to use metal, glass or other non-absorbent containers into which the fat is poured while sufficiently warm to be highly plastic or in a semi-fluid condition. In general, it has been conventional to store the shortenings so packaged at ordinary room temperature, i. e., without refrigeration. By far the major proportion of substantially dry plastic edible fat products are marketed in this fashion. In some few instances, however, substantially dry plastic edible fat products have been packaged by pouring the same in a semi-fluid form into paper containers, but the products so packaged, for example such as lard, have required refrigeration while under transportation, storage and use in the household. Although refrigeration is beneficial to the stability of the product, the primary reason for such storage under refrigeration is to prevent the occurrence of so-called "weeping," "seepage" or "bleeding" which may be described as the release from the product of liquid components which occurs at the higher temperatures. The release of liquid, it will be appreciated, quickly renders a paper-packaged product unsightly and unmarketable. The same result would occur with shortening, as now made and packaged in metal, if they were packaged in paper containers and not refrigerated.

For an adequate understanding of the reasons for such practices in the prior art, it must be remembered that a dry plastic edible fat product adapted to be used for culinary purposes is not a single chemical compound, but is composed of many different fat components which vary over a wide range in their melting and solidifying temperatures. At ordinary room temperature (defined herein as 68° to 75° F.), for example, a commercial shortening prepared in accordance with the conventional methods described above and having the requisite plasticity for good creaming and general household use, may have as little as of the order of about twenty per cent solid content, although in appearance it will resemble a soft plastic all-solid product. As the temperature is lowered, the solid-to-liquid ratio increases and as the temperature is raised the ratio decreases. It is the relatively low solid-to-liquid ratio of conventional dry edible fat products at ordinary room temperature which accounts principally for the phenomenon of "weeping," "seepage" or "bleeding" described above.

The plasticity, or characteristic of a dry plastic edible shortening which permits it to be worked is very important. It will be appreciated that a shortening which is too stiff, hard or non-plastic, will be too resistant to working, including cutting, mixing and general handling, and thus is unsuitable for ready creaming or general use in a culinary operation. On the other hand, a shortening which is too soft is also unsuitable for creaming and other general culinary operations. This property of a shortening has been referred to variously in the art, for example, as its "consistency," "plasticity," "pliability," or "ductility."

Although the methods used may vary in minor details, the measurement of the above described characteristic of a shortening by means of the so-called "penetration" test, is recognized in the art as a reasonably satisfactory test. This is analogous to the "Brinell hardness" test applied to metals. The test method which may be employed, in brief, is to measure the penetration of a standard "needle" into a sample of the shortening under uniform conditions, for example with respect to temperature. The depth of the penetration is usually expressed in arbitrary units. The further the needle penetrates the higher the penetration and softer the shortening. Conversely, a harder shortening has a lower penetration. It is important that penetration should always be related to temperature, since a change in temperature alters the solid-to-liquid ratio and therefore the penetration. Reference may be had to an article by A. D. Rich entitled, "Methods employed in expressing the consistency of plasticized shortenings," appearing in "Oil and Soap," Vol. XIX, No. 3, March, 1942, pp. 54–57, for more complete details as to this property of shortenings and its measurement.

Heretofore, the "penetration" of a shortening has been thought to be dependent exclusively upon the composition of the product, it being known that a larger proportion of harder fats, i. e., a shortening having a higher solid-to-liquid ratio at ordinary room temperature has a lower penetration. In other words, variations in the stock formula, including, for example, the extent of hydrogenation if this step is utilized, have been practically the sole means for varying the penetration of the final product. Reference may be had to my Patents Nos. 2,174,365 and 2,304,452 for a description of the effect of different components upon the penetration at different temperatures.

It has not been thought to be possible, heretofore, to materially increase the solid-to-liquid ratio of a shortening without, at the same time, reducing the penetration to such an exent as to render the product too hard for household use. The necessity for a shortening having a good creaming property at ordinary room temperature has limited the maximum amount of solid fats in the shortening at room temperature. The necessity for a complementary amount of oil has made it necessary to package the product in cans or to keep it at a sufficiently low temperature so that the liquid content at this temperature is low enough to permit paper packaging.

In accordance with the present invention, however, a method has been devised for preparing a dry plastic edible fat product having a sufficiently high solid-to-liquid ratio so as to be substantially free from undesirable "weeping," "seepage," and "bleeding" when packaged in paper containers at room temperature, while at the same time the penetration of the product at ordinary room temperature is not reduced beyond the point which is desirable for household usage of the product. The product so formed may be packaged in paper containers and stored at ordinary room temperature without becoming soiled and unsightly and, at the same time, its usefulness for culinary purposes is not impaired.

If such a shortening having such a high solid-to-liquid ratio at ordinary room temperature were to be finished or packaged by any of the conventional methods as described above, it would have so low a penetration at ordinary room temperature as not to be satisfactory for general culinary purposes. In accordance with the present invention, however, the shortening is finished and packaged in accordance with a novel method described hereinafter to provide a shortening having a penetration sufficiently high to render it satisfactory for general culinary purposes.

As described more fully hereinafter, the method of finishing a shortening in accordance with the present invention comprises rapidly cooling the shortening from a liquid to a solid state at a very low temperature, preferably while being agitated, and retaining the shortening at such a low temperature for a sufficient period of time to absorb substantially all of the latent heat of crystallization or at least sufficient to prevent more than a moderate rise in the temperature of the shortening due to further crystallization and release of latent heat following the removal of the shortening from the cooling device. As the result of such treatment, it has been found that a shortening, possibly because of a modified crystal structure, or possibly because of the working of the shortening while in a hard state at the low temperature, will have an unexpectedly high penetration value as compared with a shortening of the same composition processed by any of the conventional methods. In accordance with the present invention, this unexpected result is used advantageously to form a shortening which has a sufficiently high penetration to be used for general culinary purposes and which, at the same time, has a composition such that the solid content at ordinary room temperature is sufficient to avoid "weeping" or "bleeding" when the shortening is packaged in paper containers and stored at room temperature.

The solid-to-liquid ratio must always be expressed in relation to temperature, because this ratio always changes with temperature. Heretofore, the solid-to-liquid ratio has generally been correlated with penetration at a given temperature since it was generally thought that variations in the penetration were attributable solely to variations in the solid-to-liquid ratio.

It has been discovered, as explained heretofore, that this is not the fact, and that by the method of the invention it is possible to produce a shortening of a given solid-to-liquid ratio at ordinary room temperature, which has a higher penetration than a shortening of the same solid-to-liquid ratio at ordinary room temperature would have if processed by prior art methods.

This discovery makes it necessary to express the solid-to-liquid ratio at a given temperature in terms independent of penetration. It has been found convenient to determine this ratio by means of a dilatometer method.

This method is well-known in the art and is described, for example, in an article by C. A. Coffey and H. T. Spannuth entitled "Dilatometer measurement method as a useful tool in fat study," appearing at pp. 41-42 of the February 1940 issue of the publication of "Oil and Soap." See also the references therein cited. The dilatometer method may be described briefly as the measurement of the volume of a fat and oil mixture at a temperature intermediate the temperatures at which the mixture is completely liquid and completely solid, and calculating therefrom the ratio of solid-to-liquid existing at the measurement temperature. This test is based on the fact that the same mass of glycerides has a different density in liquid form than in solid form and therefore a different volume. It will be appreciated, therefore, that as some components of a fat melt or solidify, there will be a change in volume which is an effective measurement of the ratio of solid-to-liquid components at the temperature of measurement. For convenience, an arbitary scale of any number of units may be used to designate the difference in volume of an all-solid and an all-liquid fat of the same composition at the testing temperature. Utilizing such a scale, 0.00 may be used to designate an all-liquid fat; 1.00 may be used to designate an average of the all-solid fats, such as the vegetable oils hydrogenated to an iodine value of less than 2.0, as determined by actual dilatometer measurements. The solid-to-liquid ratio may be expressed as a fraction.

In accordance with the present invention it has been found that at ordinary room temperature, i. e., 68° to 75° F. (20° to 24° C.), and particularly at the lower temperature, a solid-to-liquid reading of at least 0.32, and preferably in the range of about 0.33 to 0.40 or more, is necessary to avoid the phenomenon of "weeping" or "bleeding" at such temperature, and that such a product may be made having a penetration in the neighborhood of 175 to 225 at 21° C. (which is requisite for a good grade shortening for use in the household) when measured as described hereinafter.

The penetration is determined with a penetrometer of the type specified by the A. S. T. M. for determining the hardness of greases and bituminous substances (see "Oil and Soap" for March 1942, supra, pp. 55-56) except that the conical shaped needle is made of aluminum and weighs 47 grams. The construction and operation of this instrument is understood by those skilled in the art.

In making the penetration determination the shortening is kept at the indicated temperature ±1° F. for at least twenty-four hours before taking the reading. The surface of the shortening is scraped smooth and the tip of the penetrometer needle is lowered so that it just touches the smooth surface of the shortening. The penetrometer recording shaft is then lowered to contact the end of the needle spindle. The penetrometer dial is then turned to the zero position without disturbing the positions of the needle spindle or the recording shaft. The needle is then elevated equivalent to exactly 200 divisions on the indicator, and the needle is then released quickly by pressing the knob on the penetrometer for this purpose. The needle falls and sinks into the shortening a given distance depending upon the hardness or softness of the shortening at the temperature at which it is tested. The recording shaft is then lowered until it just touches the end of the needle spindle. The reading on the indicator dial is known as the penetration.

In accordance with the present invention a dry plastic edible fat having a solid-to-liquid ratio of not less than 0.32 may be finished to produce a product having a penetration of at least 175 at 21° C. when measured as described above. In general, it is preferred to utilize a fat having a solid-to-liquid ratio of about 0.33 to 0.45 at ordinary room temperature to form a shortening having a penetration of about 180 to 225 at 21° C.

The practice of the present invention may be carried out conveniently in any suitable conventional rapid cooling apparatus or modification thereof. The essential requirement of such an apparatus is a sufficiently rapid heat transference to permit the rapid cooling of the shortening to a low temperature. In general, this may be accomplished by the use of a cooling medium applied in any conventional manner such as by jacketing. A cooling medium at a temperature of as low as −35 to −50° C. has been found advantageous in order to obtain the desired quick cooling. Means for agitating or working the mass during cooling is desirable to subject all parts of the shortening equally to the cooling action, and also to accomplish aeration of the shortening, if this step is desired. The apparatus may be operated under pressure if desired.

In accomplishing the objects of the present invention, it is deemed essential to cool the fat to a stabilized temperature of at least 15° C. and preferably below 10° C., for example, in the range of about 0 to 10° C. There is no lower limit to the temperature except as expediency requires. This may be accomplished rapidly in as short a period of time as 10 to 25 seconds in most apparatuses, using a cooling medium at a temperature of the order of −35° C. By a stabilized temperature is meant the temperature which is reached after substantially all of the latent heat has been absorbed or, in other words, which is not exceeded by the release of any latent heat following the release of the fat from the cooling apparatus. In general, it is desirable to temper the fat by retaining it at such a low temperature for a moderate period of time. Such a tempering period, however, is inherent in the process because after all the latent heat has been absorbed, the temperature will rise only very slowly.

As specific examples of the improvement effected in accordance with the present invention, reference may be had to the following table of test results obtainable by the practice of the present invention as compared with the result obtained in accordance with the practices of the prior art.

penetration at 21° C. is 170, which is below the preferred range. When processed in accordance

*Table I*

| Sample | In accordance with Prior Art | In accordance with Invention | Chilling temperature | Packing temperature | Solid-to-Liquid Ratio at Ordinary Room Temp. | Penetration at— | | | |
|---|---|---|---|---|---|---|---|---|---|
| | | | | | | 21° C. | 27.5° C. | 32.5° C. | 37.5° C. |
| | | | °C. | °C. | | | | | |
| A | Yes | No | 15 | 28 | 0.32 | 170 | 260 | 363 | (²) |
| B | Yes | No | 15 | 28 | 0.335 | 153 | 200 | 320 | (²) |
| C | Yes | No | 15 | 28 | 0.29 | 190 | (¹) | (¹) | (¹) |
| D | No | Yes | 0 | 0 | 0.38 | 170 | 200 | (¹) | 400 |
| E | Yes | No | 15 | 28 | 0.38 | 130 | (¹) | (¹) | (¹) |
| F | No | Yes | 0 | 0 | 0.32 | 205 | 390 | (¹) | (¹) |

¹ Measurement not taken at this temperature.
² Too soft to measure.

In consideration of the above table the sample A, which is made in accordance with the prior art from a stock having a solid-to-liquid ratio at ordinary room temperature of 0.32 has a penetration of 170 at 21° C. This is slightly lower penetration than is preferable in a shortening for household culinary use, and therefore represents a slightly higher solid-to-liquid ratio than can be processed by prior art methods.

This is all the more apparent from a consideration of sample B, which when processed in the same way from a stock having a solid-to-liquid ratio at ordinary room temperature of 0.335 has a penetration of 153. This penetration is much too low and results in a fat much too hard for household use. This demonstrates the above statement that a stock having solid-to-liquid ratio at ordinary room temperature of less than 0.32, is as high as is practical if processed by prior art methods.

Sample C may be regarded as representative of a product made in accordance with the prior art having a penetration of 190 at 21° C., which is suitable for ordinary culinary use as this temperature. Note in this connection that the solid-to-liquid ratio at ordinary room temperature is 0.29 which is much less than the minimum (0.32) that may be utilized in accordance with the invention.

Sample D, which is made in accordance with the invention, has a penetration of 170 at 21° C. This sample has the same penetration as sample A at this temperature. It is important to note, however, that the solid-to-liquid ratio at ordinary room temperature of sample D is 0.38 or a much greater amount of solids. This is a sufficiently large difference to prevent the "weeping" or "bleeding" of the shortening in a paper package at ordinary room temperature.

Sample "E" is prepared from the same stock as sample D, namely, one having solid-to-liquid ratio at ordinary room temperature of 0.38. The penetration of such a sample at 21° C. is 130 and so low as to make almost a brick-hard product at ordinary room temperature and entirely unsuited for culinary operations. This clearly demonstrates that stocks having a high solid-to-liquid ratio which would prevent "bleeding" or "weeping" from paper packages at ordinary room temperature could not be used by prior art methods to make a satisfactory culinary product.

Sample F may be compared with sample A to show the effect of the new method in comparison with the prior art method of treating a stock having the same solid-to-liquid ratio at ordinary room temperature, namely 0.32. When processed in accordance with the prior art (sample A) the with the invention the penetration of this same stock (sample E) has a penetration at 21° C. of 205, which is within the range that is practical for ordinary culinary use.

Although the plasticity (penetration) of a shortening at room temperature is of immediate concern to the housewives, cooks and bakers who ordinarily use their shortenings for culinary purposes, there are other qualities of a shortening which are important. Users of shortening desire a product which stands up well at temperatures above ordinary room temperature, i. e., a shortening whose penetration increases as little as possible as a result of heating. It is an unexpected advantage of a shortening prepared in accordance with the present invention that the penetration, when measured at temperatures higher than ordinary room temperature, increases a smaller amount than a shortening prepared in accordance with the prior art but has the same penetration at ordinary room temperature. In this respect the penetration of samples A and D (which have the same penetration at ordinary room temperature) at a temperature of 37.5° C. shows improvement in this respect.

A further requirement of a good grade shortening is that it will cream well and will have a minimum break-down during working. It is well-known that when a shortening is subjected to working, such as in a beater, the resistance to working decreases, possibly because of a breakdown of the crystal structure of the shortening. The resistance of a shortening to such a breakdown under working is defined in the art as its "body." A simple device for measuring the body of a shortening is the so-called Brabender "Plastograph" which is a viscosimeter developed in the starch industry for measuring the amount of work required to knead dough. It is essentially a stirring device provided with a dynamometer for measuring the resistance of the shortening to the stirring operation. The initial test procedure is to start the Brabender "Plastograph" charged with shortening and to take viscosity readings at regular short-time intervals. The resistance of the shortening to working drops rapidly at first, but at the end of about 5 minutes the resistance to working of a good grade shortening levels off, i. e., stays constant. An initial resistance reading is taken at ½ minute after the "Plastograph" is started, and this is followed by 5 readings at one minute intervals. The body of the shortening is usually calculated as the total of the six readings minus the initial reading. It will be apparent that a shortening having a higher body, and hence a higher Brabender reading, is more satisfactory for culinary purposes, provided, of course, its penetration is within the acceptable range.

It is generally believed on the basis of prior art methods that for the same stock, the shortening which has a higher penetration (softer) will have a lower body. This seems logical since a softer shortening would seem to stand less working. It is an unexpected advantage of the present invention, however, that the increase in penetration of a shortening processed by the invention results in a shortening whose body is not disadvantageously affected. This unexpected result may be more readily understood by reference to the following table of test results obtained in which two of the samples listed in Table I are listed with data as to body.

Table II

|  | Sample "A" | Sample "F" |
|---|---|---|
| Penetration—21° C | 170 | 205 |
| Brabender Body (total minus initial) | 1,430 | 1,440 |

The characteristics of a shortening described above, such as its penetration, must be controlled within narrow ranges in order to comply with present commercial standards for good grade shortenings. However, there is not necessarily a direct relationship between such values and the qualities of the shortening for baking purposes. The requirement of a shortening for baking purposes is to impart a large volume to the baked product and to provide a product having the lightest texture. The shortenings prepared in accordance with the present invention have been carefully tested by the baking of standard-test cakes, and it has been found that the shortening is comparable to those prepared in accordance with the prior art in this respect.

A further advantage of the present invention results from the use of low temperatures in the finishing operation. As is set forth above, the shortening may be packaged in paper and similar containers and may be stored at room temperature without becoming soiled and unsatisfactory. In accordance with the present invention the shortening at the low finishing temperatures utilized is sufficiently hard to permit of the use of automatic paper packaging equipment and thus there results a material saving in the cost of packaging. For convenience the shortening may be extruded, for example, from the cooling device in the form of a bar which may be cut into cakes and wrapped while the bar is hard.

It will be apparent that the invention may be susceptible to many variations by one skilled in the art without departing from the teaching of the present invention, and all such variations are intended to be included within the scope of the invention.

I claim:

1. A method of preparing a substantially dry plastic edible shortening having a penetration of about 175 to 225 at 21° C. so as to permit its use for general culinary purposes, comprising preparing a molten stock having a solid-to-liquid ratio of about 0.33 to 0.40 at a temperature within the range of 68 to 75° F. so as to be relatively free from weeping and bleeding at said temperature, rapidly chilling said stock to reduce the temperature thereof to at least as low as 0° to 10° C., and maintaining it at said temperature until substantially all of the latent heat of crystallization has been liberated.

2. A method of preparing a substantially dry plastic edible shortening having a penetration of at least 175 at 21° C. so as to permit its use for general culinary purposes, comprising preparing a molten stock having a solid-to-liquid ratio of about 0.33 to 0.40 at a temperature within the range of 68° to 75° F., so as to be relatively free from weeping and bleeding at said temperature, rapidly cooling said stock to reduce the temperature thereof to at least as low as 15° C. and solidifying all of the components of the fat which are solid at said temperature by maintaining the cooled stock at a temperature of not above 15° C. until substantially all of the latent heat of crystallization has been liberated.

ARNE GUDHEIM.

REFERENCES CITED

The following references are of record in the file of this patent:

UNITED STATES PATENTS

| Number | Name | Date |
|---|---|---|
| 1,911,222 | Bollens | May 30, 1933 |
| 2,013,025 | Bottoms | Sept. 3, 1935 |
| 2,063,065 | Vogt | Dec. 8, 1936 |
| 2,075,358 | Reeves | Mar. 30, 1937 |
| 2,154,452 | Jenness | Apr. 18, 1939 |